April 19, 1955 D. M. JOHNSON ET AL 2,706,348

MERCHANDISING RECORD AND EXHIBITING APPARATUS

Filed Sept. 28, 1951 4 Sheets-Sheet 1

INVENTORS
D. M. JOHNSON
G. M. WALTON

BY A. Yates Dowell
ATTORNEY

MERCHANDISING RECORD AND EXHIBITING APPARATUS

Filed Sept. 28, 1951

Inventors
D. M. JOHNSON
G. M. WALTON

A. Yates Dowell
Attorney

MERCHANDISING RECORD AND EXHIBITING APPARATUS

Filed Sept. 28, 1951 4 Sheets-Sheet 3

INVENTORS
D. M. JOHNSON
G. M. WALTON
BY
A. Yates Dowell
ATTORNEY

INVENTORS
D. M. JOHNSON
G. M. WALTON
BY
A. Yates Dowell
ATTORNEY 2,706,348
Patented Apr. 19, 1955

2,706,348

MERCHANDISING RECORD AND EXHIBITING APPARATUS

Darrell M. Johnson and George M. Walton, Thomson, Ga., assignors to The Laudar Company, Thomson, Ga., a corporation of Georgia Application September 28, 1951, Serial No. 248,814

3 Claims. (Cl. 35—24)

Figure 1:
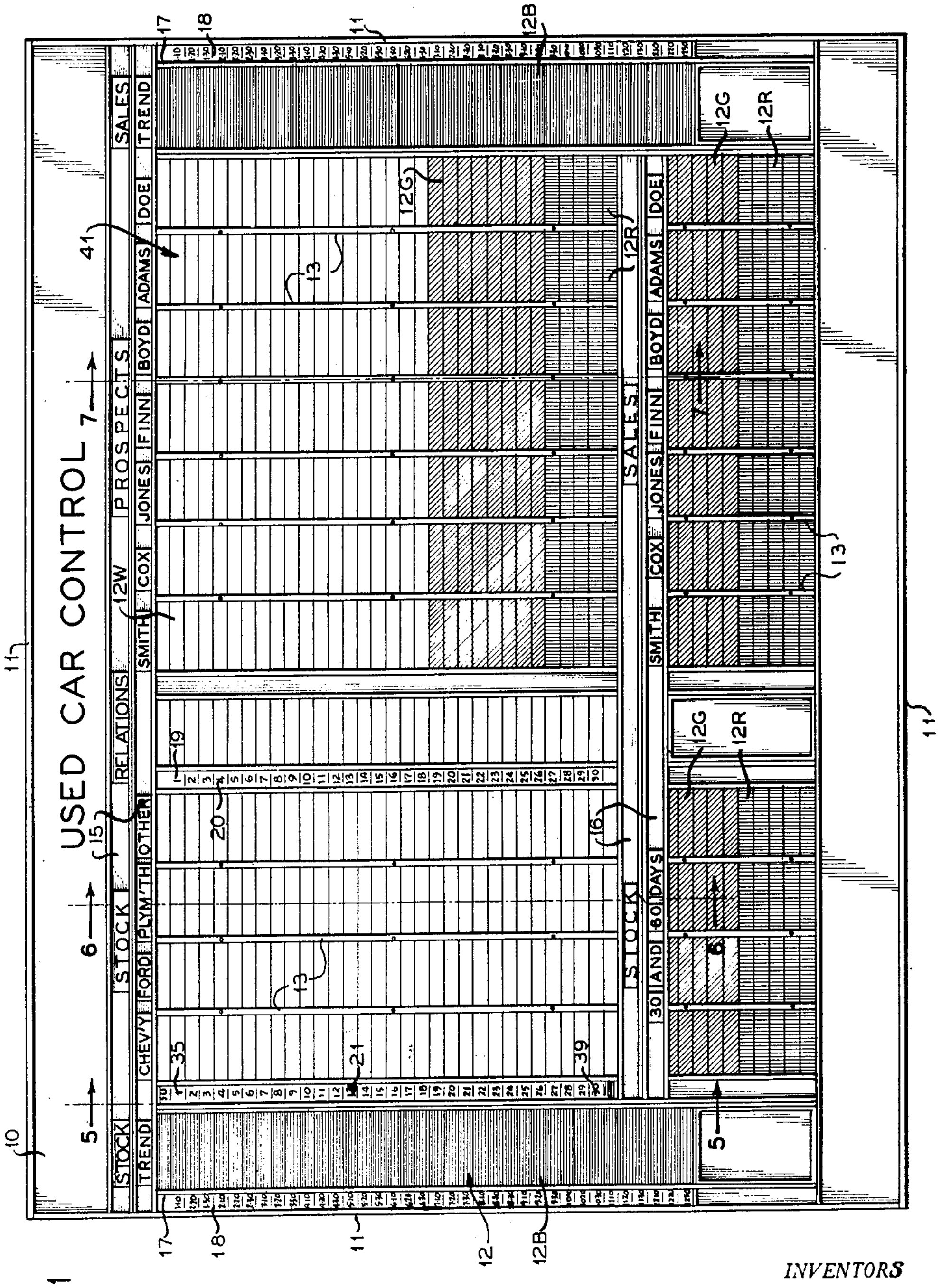

This invention relates to the art of merchandising and more particularly to the sale of used or second hand automobiles or other objects and the conduct of a sales operation of this character in a manner to simplify and reduce the overhead and time involved in selling and keeping the necessary records as well as to increase sales.

Specifically, the invention relates to apparatus or equipment used and the method of use in such operation by means of which all activities are apparent, including the industriousness and ability of individuals, the items sold and for sale, as well as the trends and whether they are normal or abnormal.

In large sales operations, ordinarily there is much lost motion and inefficiency with consequent minimum profit and maximum operating costs. Also, the impression upon customers, particularly as to the manner of operation, is far from what may be desired. This is particularly true where used or second hand automobiles or other articles are sold.

Also proper cooperation between repair and sales is not always had or suitably coordinated and these and other undesirable conditions increase the problems of satisfactory and profitable operation.

It is an object of the invention to provide apparatus and instructions for the use of the same by means of which used articles such as, for example, automobiles or other commodities, may be satisfactorily merchandised with a minimum consumption of time, effort, and personnel, with maximum efficiency and with accurate appraisal of the true situation perceptible at all times, enabling the rendering of maximum service and satisfaction to customers.

Another object of the invention is to provide equipment and instructions for the use of the same so that not only knowledge and appraisals of conditions may be obtained at a glance, but additionally the conditions of sales prospects, inventories, and sales, as well as anticipated operations.

Another object of the invention is to provide a current display from which can be ascertained the analysis of said sales, inventories of stock on hand, prospects of sales, and the trend of sales, on an overall as well as on a ten day's basis, so that management in the conduct of the business can keep constantly alert as to what is actually transpiring and correct any difficulty or interference with the smooth operation of the business.

A further object of the invention is the provision of a simplified method of keeping records of the sales of new or used automobiles or other objects as well as providing an improved appraisal record and repair order for instructing the service or maintenance shop in the repair and conditioning of an automobile or other object to be sold.

A further object of the invention is to provide a follow-up system whereby customers who have purchased automobiles and the like may be reminded at regular time intervals of certain services to be performed.

A still further object of the invention is to modify what might be a laborious operation into one in which extra effort is removed or minimized so that the operation becomes an interesting pleasurable one with the utilization of personality and competition.

Figure 2:
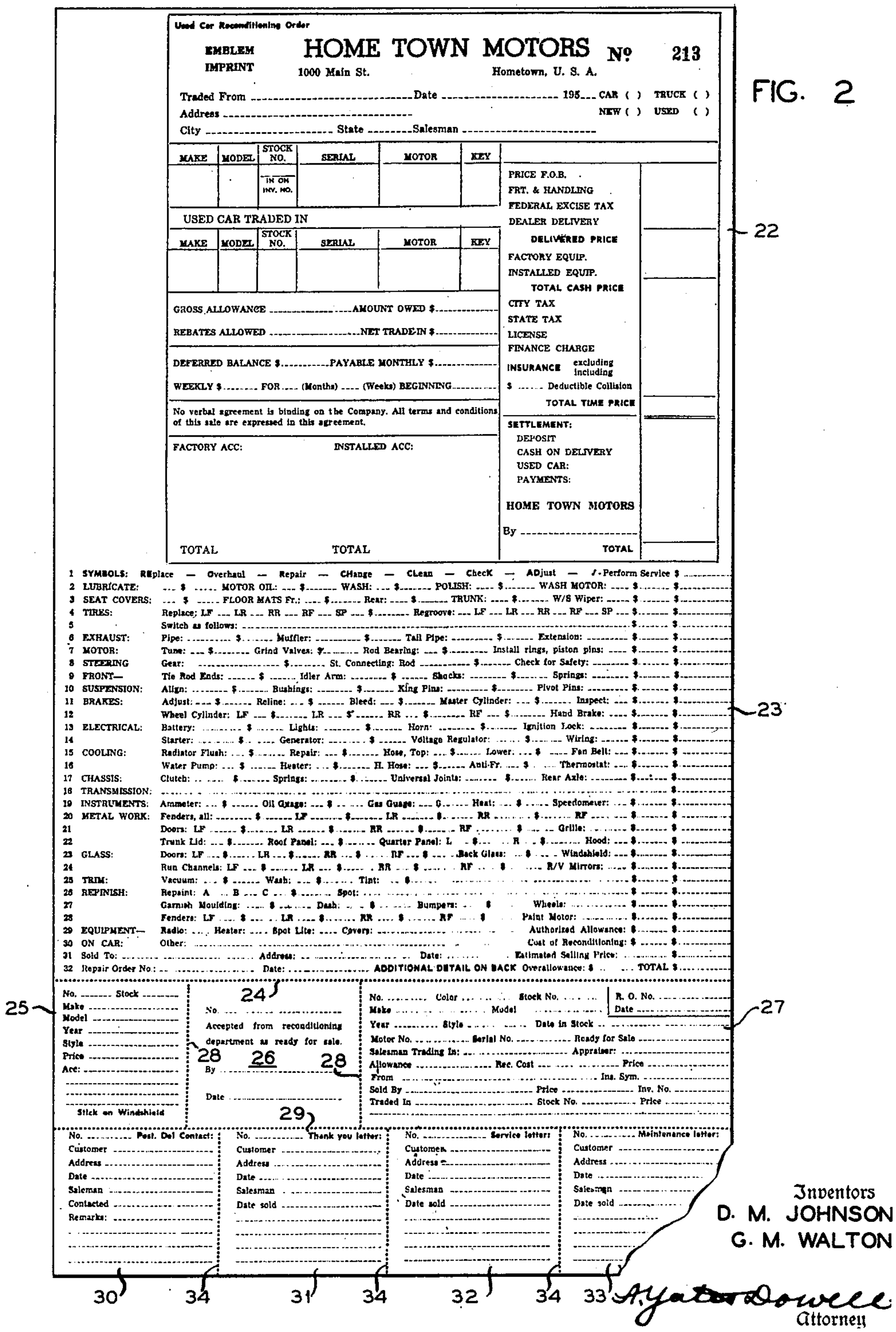
Figure 3:
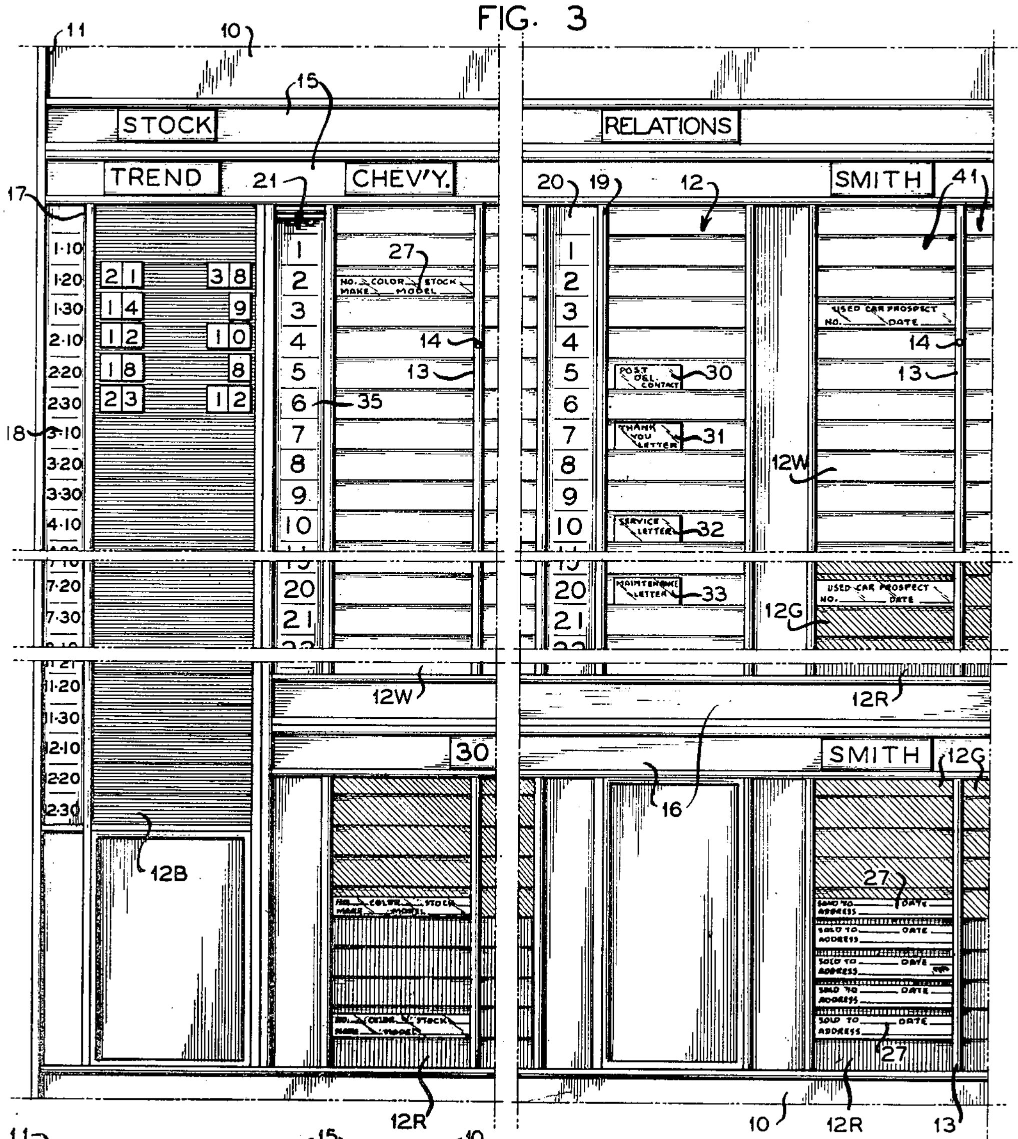
Figure 4:
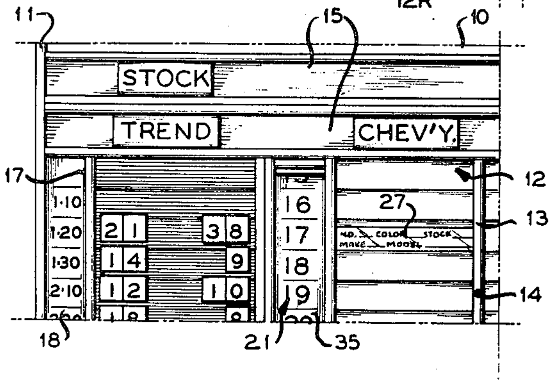
Figure 9:
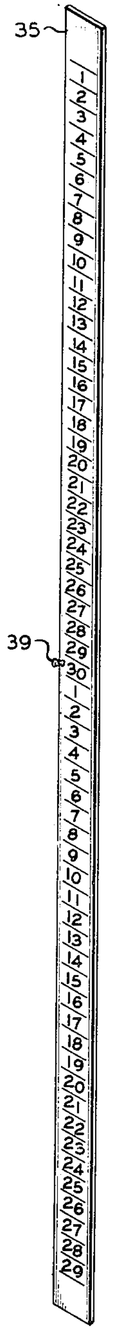
Figure 8:
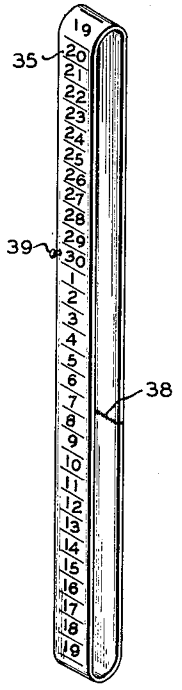
Figures 5, 6, 7:
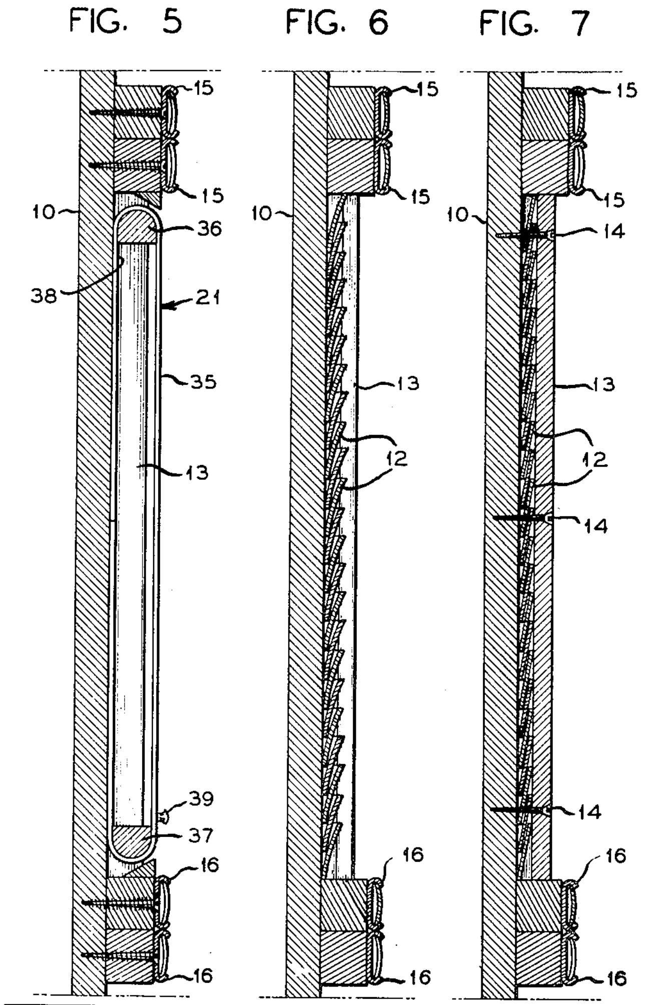
Figure 10:
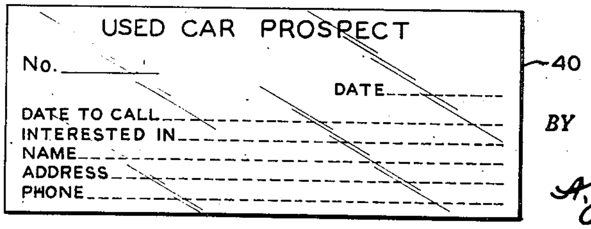

Further objects and advantages of the invention will be apparent from the following description taken in conjunction with the accompanying drawings, wherein:

Fig. 1 is an elevation of the display or used car control equipment;

Fig. 2, an elevation of a combination work sheet, invoice, and record bearing card;

Fig. 3, an enlarged fragmentary elevational view of various sections of the display device in use;

Fig. 4, a further fragmentary elevation showing use of the one portion of the display device;

Fig. 5, a section on the line 5—5 of Fig. 1;

Fig. 6, a section on the line 6—6 of Fig. 1;

Fig. 7, a section on the line 7—7 of Fig. 1;

Fig. 8, a perspective of time interval indicating means;

Fig. 9, a perspective of the time interval indicating means of Fig. 8, fully extended;

Fig. 10, an elevation of a used car prospect card; and

Figure 11:
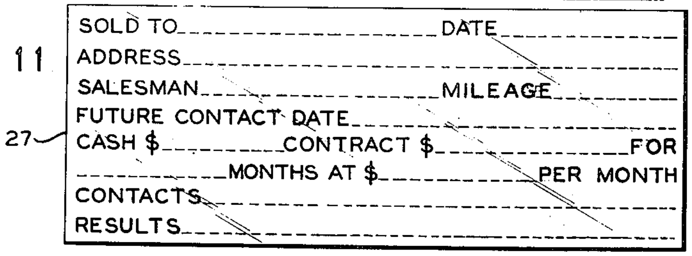

Fig. 11, an elevation of the reverse side of a detached portion of the record bearing sheet of Fig. 2.

With continued reference to the drawings, there is shown in Fig. 1, a display unit which may be of any construction including readily available materials and for purposes of illustration it includes a foundation or base panel 10 of wood, plywood, plastic, or other material of any desired configuration, satisfactory to the artistic or aesthetic taste.

For convenience the display unit may be of substantially rectangular or other desired shape and may include any suitable finish or molding 11 to improve its appearance and protect its edges. If desired, this molding may have a protective sheet or coating of any desired substance such as metal, plastic paint or the like.

As illustrated, the panel is divided into upper and lower sections of vertical columns. These columns are produced by relatively thin concavo-convex slats 12 of relatively thin steel or plastic or other preferably resilient material similar to that employed in conventional Venetian blinds. The foundation panel may be of any desired size and the strips of appropriate length. The display may be economically constructed by severing strips from an endless length of stock and securing such severed strips or slats in parallel relation as shown with their convex sides rearward adjacent the face of the base panel 10.

These strips or slats 12 are held in position by means of ribs 13 so that the lower edge of one strip is located behind and substantially centrally of the next lower strip and in contact with the same so that a card inserted within the slats will be gripped and held frictionally in place. These ribs are held in position by means of fastening elements 14 which serve to supply the necessary tension on the slats and by adjustment of these fastening elements tension may be varied as necessary. At the top of the display are upper and lower horizontal or transverse name panels 15 of identical construction the upper of which may contain general designations such as stock, relations, prospects, sales or the like, while the lower may contain specific designations such as makes of cars, salesmen's names, trends and the like.

A second pair of similar but shorter name panels 16 are disposed along the lower portion of the display, the upper of which may include such general designations as stock and sales, while the lower of which may include specific designations of the stock on hand, and length of time on hand while under Sales is the salesman's name.

To distinguish certain of the columns as for example the left and right hand columns of the display, the slats contained therein may be of distinctive color such as, for example blue as shown at 12B while slats 12G and 12R in the lower portion of the prospect columns are colored green and red respectively and those in the remainder of the upper section are white. In the lower section of the board the upper and lower slats 12G and 12R are similarly colored green and red to indicate time intervals in the sales section and denotes the ability of individual salesmen to make at least five sales a month in order to get "out of the red" there being provided five of such slats 12R.

At the marginal edges of the display are panel members 17 corresponding to the panel members 16 except that they are vertically disposed. Disposed within the panel members 17, are strips 18 which indicate the months of the year and divide each month into three ten day periods for indicating to the sales manager the number of sales made in each ten day period for any particular month and/or the number of items in stock for a similar ten day period for the present or past year, whether or not such stock had been on hand for more or less than thirty and sixty days as he may desire.

At the right of the upper stock section is the Relations section having thirty-one slats to the immediate left of which is a panel 19 similar to panel 17 in which is mounted a numeral bearing strip 20 numbered from 1 to 30 inclusive and indicating each day of the month. The purpose of this is to reveal to the manager certain information to be mailed or otherwise delivered to a customer, such as the remainder of the 1,000 mile check-up, or for other services of any kind.

To the left of the Realtions section on the display board is a stock section which may be divided into any desired number of sections there being four shown in Fig. 1. The stock section is likewise provided at its extreme left side with a numeral bearing strip 21 which also indicates the day of the month. However, it differs from the strip 20 in that it is movable, the purpose of which will be later described.

The invention contemplates utilizing a bill of sale 22 in triplicate or quadruplicate the last copy of which includes a mechanical check list and repair sheet 23. Also attached to the final copy as by a horizontal perforated or weakened line 24, are three information bearing cards 25, 26, and 27 separated by vertical perforated or weakened lines 28. Attached to the cards 25, 26 and 27 by a horizontal perforated or weakened line 29 are four information bearing cards 30, 31, 32 and 33 separated by vertical perforated or weakened lines 34.

Upon receipt of an automobile in stock, that is to say a used automobile which has been traded for a new one, the car is given a stock number, the number being the same as the stock number assigned to the new car which it was traded for but having the addition of the letter A behind it which will identify it as a car which has been traded for a new one. Upon the sale of the new car a bill of sale such as shown at 22 in Fig. 2 is made, this bill containing the usual information found on such a contract but also has indicated thereon the make, model, stock number, serial number, motor number, and key number of the used car which was traded for the new one, beneath which numbers are spaces wherein the amount owed, trade in allowed, etc. are to be indicated. This bill is made out in triplicate or quadruplicate and a bookkeeper will then take this third or last copy and follow through on the portions 25, 26, 27, 30, 31, 32, and 33 with all of the information which has appeared on the bill of sale 22 which will include the make, stock number, number of the invoice, model of the car, year, style, price, if available, and accessories.

This third or last copy will then be delivered to the manager who will inspect the automobile which has been received in trade for its possible sales value. After such inspection he will fill in section 23 of the card, said section indicating the mechanical condition of the automobile. Upon checking the automobile and indicating the work to be done on the car before it can be sold plus the amount of money required to make such repairs he will verbally transfer the information on section 23 to the service manager. The service manager in turn will fill out his repair order and apply the repair order number to the section 27.

The lowermost portions 30 to 33 inclusive will then be detached from the sections 25, 26, and 27 and placed appropriately in the relations section of the display panel, the reason for which will later be described. Portions 26 and 27 are placed in the stock section beneath the column indicating the make of the automobile in vertical alignment with the numeral 1 on the movable strip 21 to indicate the number of days a car has been in stock from one to thirty days.

The movable strip 21 may comprise a tape 35 of spring steel, plastic, or any other suitable material such as the type used in collapsible rulers which would tend to conform with the shape as shown in Figs. 5 and 8. The strip will be wrapped or bent around upper and lower blocks 36 and 37 which may be secured to the base 10 by any suitable means and when placed around these blocks the ends of the tape 35 may be butt welded or otherwise fastened as shown at 38 in Figs. 5 and 8 to form a smooth, continuous, endless belt. It will be noted in Fig. 9 that a manipulating knob 39 is placed approximately midway of the tape 35 when the tape is fully extended. Adjacent to the knob 39 is the number 30 and above the knob and beneath the knob the numbers 1 to 29 are printed or otherwise applied to the tape 35. In the use of said movable strip the knob 39 will be positioned so as to align the number 30 with the lowermost pocket and the number 1 with the uppermost pocket providing 30 pockets in all, one for each day of the month.

As previously described the indicating strip 35 is moved upwardly one division each day leaving the cards 27 stationary in the pockets in which they are placed thereby affording a means of having a day by day 30 day indication of those particular cards without having to remove the cards from their pockets to conform to each day. When the number 30 appears in alignment with any particular row of cards those cards will be removed and placed in the 30 to 60 day stock section in the lowermost portion of the display panel. When the knob 39 has reached its uppermost limit the cards in the lowermost pockets will be adjacent the number 29 and when the manipulating knob is lowered completely from top to bottom it will then indicate the cards in the lowermost pocket as being in stock 30 days and the operation will then start anew by the sales manager moving said strip upwardly one notch at a time. The card 27 is placed opposite numeral 1, the day it is taken in trade with the portion 26 folded back of it. The portion 26 remains attached until the car is ready for sale, having been conditioned as called for on section 23. Section 26 is then signed as a receipt to the service foreman, detached from 27, thereby indicating the car is inventoried, conditioned, and ready for sale.

When the automobile has been completely reconditioned for sale and after testing to see if such reconditioning has been satisfactory, the section 26 of the card will be detached and given to the service foreman as a receipt for completed work, the section 27 indicating that the car is now ready for sale. By glancing at the stock card 27 and observing the number on the indicating strip 35 which will then be opposite this card, the sales manager will immediately be informed as to how long it took to repair the automobile and thereby determine the efficiency of the service manager and his repair department. Card number 25 is made to adhere to the windshield of the automobile giving the necessary information to salesmen by number corresponding to card 27 on the board.

The card 27 indicating that particular automobile will remain in the upper stock section of the display panel until the movable strip 35 has been moved so that the number 30 is in alignment with the card 27 which will indicate that the car has been in stock for thirty days at which time the card will then be removed from this upper section and placed in a green pocket formed by the slats 12G in the lower section of the stock columns and will remain there from thirty to sixty days. If at the end of that time it is still not sold the card 27 will be placed still further down in pockets formed by slats 12R which indicates cars in stock for sixty days or more. When the car is sold the card 27 which is the inventory card will be turned over and placed in the salesman's sales columns indicating the final and complete sale. At this time information relative to the sale is placed on the back of card 27, as illustrated by Figure 11.

The information recorded on the reverse side of card 27 as shown in Fig. 11, serves to indicate who purchased the car listed on front side thereof, also the salesman's identity. It will ascertain the approximate time the customer will trade-in this purchase for another car. With this information the card 27 is placed in a card file for operation in conjunction with the board. On the first of each month all cards filed under that month are removed and spread in pockets 12W in section 41 as possible and probable prospects for that month. The cards are placed under name of salesman who originally sold the car so that he will be reminded to contact the customer for another possible sale. All the information needed about the customer is also shown such as cash paid, amount financed, number of months and amount of payments. Results of the contacts are noted by salesman, and if a new contact date is pertinent, the first date is deleted and a new contact date is indicated. If the new date is in another month other than present the card is placed again in the card file under that month, for example September 1952 and then spread with others of that month back on the board for another contact by salesman. Thus, section 41 is the prospect section using both cards shown in Figs. 10 and 11, for advancing information to salesmen.

After the sale has been completed the cards 30—33 inclusive are detached and placed in proper position in the Relations column. For example, if a car was sold on the last day of the month, card 30, which is the post delivery contact card, would be placed adjacent to number 5 indicating to the sales manager that on the fifth of the month he must contact the customer to determine whether the sale was satisfactory. Card 31 would be placed adjacent to number 7, card 31 being the thank you letter card and will indicate that on the seventh day of the month a thank you letter should be sent to the customer. Next to the number 10 on the indicating strip 20 the card 32 should be placed. This is the service letter card and will remind the customer that ten days after the sale has been made the car should be brought back into the shop for a complete service check-up. Next to the number 21 the card 33 should be placed. This is the maintenance letter card and indicates that on the twentieth of the month a letter should be written by the service manager or shop foreman reminding the customer that his car is in need of regular maintenance, check-ups, and other services, for satisfactory operation.

If at the sale of the used car the customer trades in another car for that one the trade-in is given the same number as the original new car, as for example a new car might be designated with the stock number 101 and a used car received in trade for car 101 would receive the number 101–A. When the traded car is subsequently sold and another car received in trade, it will receive the number 101–B until the last trade-in when the number 101 is discarded.

This invention also contemplates the provision of used car prospect card 40 which bears indicia and space for the date, customer's name, address, city, type of car he would be interested in, etc. These cards are placed in the vertical columns 41 beneath the section of the display board designated as prospects. Above each individual column in this section is the name of a salesman. When a prospect is contacted a prospect card 40 will be placed beneath the salesman's name in the uppermost portion of the vertical columns 41 formed by slats or strips 12W which are white. The prospect card 40 will remain in pockets formed by such slats for a period of from one to ten days at the end of which time the sales manager will remove the card therefrom and place it in pockets formed at 12G indicating the color green and it advises the salesman that the prospective sale has now been pending for a period of from 11 to twenty days. If at the end of that period of time a sale has not been made, the card 40 is removed and placed further down in that section in the pockets 12R which are red in color and indicate that the prospective sale has not been consummated at the end of twenty or more days. If still unsold at the end of thirty days the card is removed from the display board and discarded as a lost sale.

It will be obvious to those skilled in the art that various changes may be made in this invention without departing from the spirit and scope thereof and this application is not limited by anything which is shown in the drawings or described in the specification but only as indicated in the appended claims.

What is claimed is:

1. Sales and control apparatus comprising a frame, a series of concavo-convex flexible slats carried by said frame and disposed in overlapping relation with their concave faces outermost and with their edges substantially parallel, said slats forming pockets, the lower edge of each slat contacting the rear face of the next lower slat along substantially the longitudinal center line thereof to provide a yieldable closure for the bottom of each pocket whereby cards of varying length may be inserted in said pockets with portions thereof projecting below and being firmly but releasably retained by said yieldable closures, column forming strips mounted on said frame transversely of said strips for defining separate pockets, adjustable tensioning means reacting between said frame and said strips for variably pressing said slats together under pressure, said slats having an area of one color and adjacent areas of additional colors providing distinct sections for holding record bearing cards and indicating the differences between them, an endless belt movably associated with said frame, said belt having indicia denoting time and days, and means whereby said belt may be moved.

2. Sales and control apparatus comprising a frame, a series of concavo-convex flexible slats carried by said frame and disposed in overlapping relation with their concave faces outermost and with their edges substantially parallel, said slats forming pockets, the lower edge of each slat contacting the rear face of the next lower slat along substantially the longitudinal center line thereof to provide a yieldable closure for the bottom of each pocket whereby cards of varying length may be inserted in said pockets with portions thereof projecting below and being firmly but releasably retained by said yieldable closures, column forming strips mounted on said frame transversely of said strips for defining separate pockets, adjustable tensioning means reacting between said frame and said strips for variably pressing said slats together under pressure, said slats having distinctive areas providing dissimilar sections for holding record bearing cards and indicating the differences between them, an endless belt movably associated with said frame, said belt having indicia denoting time and days, and means whereby said belt may be moved.

3. Sales and control apparatus comprising a frame, a series of concavo-convex flexible slats carried by said frame and disposed in overlapping relation with their concave faces outermost and with their edges substantially parallel, said slats forming pockets, the lower edge of each slat contacting the rear face of the next lower slat along substantially the longitudinal center line thereof to provide a yieldable closure for the bottom of each pocket whereby cards of varying length may be inserted in said pockets with portions thereof projecting below and being firmly but releasably retained by said yieldable closures, column forming strips mounted on said frame transversely of said strips for defining separate pockets, adjustable tensioning means reacting between said frame and said strips for variably pressing said slats together under pressure, said slats having an area of one color and adjacent areas of additional colors providing distinct sections for holding record bearing cards and indiciating the differences between them, and an endless belt movably associated with said frame.

References Cited in the file of this patent

UNITED STATES PATENTS

| | | |
|---|---|---|
| 1,711,981 | Andres | May 7, 1929 |
| 2,234,249 | Hanford | Mar. 11, 1941 |
| 2,419,631 | Curtenius | Apr. 29, 1947 |

FOREIGN PATENTS

| | | |
|---|---|---|
| 863,509 | France | Jan. 2, 1941 |
| 646,039 | Great Britain | Nov. 15, 1950 |
| 373,281 | Italy | July 24, 1939 |